US011280623B2

(12) United States Patent
Batta et al.

(10) Patent No.: US 11,280,623 B2
(45) Date of Patent: Mar. 22, 2022

(54) PREDICTIVE INTERSECTION SEARCH

(71) Applicant: Verizon Patent and Licensing Inc., Arlington, VA (US)

(72) Inventors: Andrew Batta, Broomfield, CO (US); Carolyn Vlach, Denver, CO (US); Chad Kearney, Denver, CO (US); Jonathan Harahush, Golden, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 49 days.

(21) Appl. No.: 16/695,453

(22) Filed: Nov. 26, 2019

(65) Prior Publication Data

US 2020/0096350 A1    Mar. 26, 2020

Related U.S. Application Data

(63) Continuation of application No. 15/624,284, filed on Jun. 15, 2017, now Pat. No. 10,520,322.

(51) Int. Cl.
| | | |
|---|---|---|
| *G01C 21/34* | (2006.01) | |
| *G08G 1/123* | (2006.01) | |
| *G06F 16/29* | (2019.01) | |
| *G06F 16/9537* | (2019.01) | |
| *G06F 3/023* | (2006.01) | |
| *G01C 21/36* | (2006.01) | |
| *G06F 7/00* | (2006.01) | |
| *G06F 17/30* | (2006.01) | |

(52) U.S. Cl.
CPC .......... *G01C 21/34* (2013.01); *G01C 21/3611* (2013.01); *G06F 3/0233* (2013.01); *G06F 16/29* (2019.01); *G06F 16/9537* (2019.01)

(58) Field of Classification Search
CPC ............... G01C 21/34; G01C 21/3611; G06F 19/9537; G06F 16/29; G06F 3/0233; G06F 17/30807; G06F 17/30; G06F 16/2425
USPC .................................. 701/533; 707/775, 708
See application file for complete search history.

(56) References Cited

U.S. PATENT DOCUMENTS

| | | | | |
|---|---|---|---|---|
| 10,176,633 | B2 * | 1/2019 | Moore | ................. G06F 3/0481 |
| 2010/0138150 | A1 * | 6/2010 | Watarai | .................. G10L 15/26 |
| | | | | 701/533 |
| 2013/0325839 | A1 * | 12/2013 | Goddard | ............. G06F 16/9537 |
| | | | | 707/708 |
| 2015/0370851 | A1 * | 12/2015 | Taguchi | .................. G06F 16/00 |
| | | | | 707/775 |

(Continued)

*Primary Examiner* — Mahmoud S Ismail

(57) ABSTRACT

A device can receive input indicating an intersection of two or more roads. The device can identify the two or more roads included in the input using an indicator. The device can determine a geographic location of another device using information that identifies the geographic location received from the other device. The device can identify a data structure that includes information identifying a set of intersections associated with the geographic location. The device can perform a search of the two or more roads using the information identifying the two or more roads and the information included in the data structure. The device can determine a priority for one or more results of the search for the intersection after performing the search of the two or more roads. The device can provide the one or more results of the search for the intersection to permit and/or cause an action to be performed.

20 Claims, 7 Drawing Sheets

(56) References Cited

U.S. PATENT DOCUMENTS

2018/0060827 A1* 3/2018 Abbas .................. G05D 1/0285
2018/0322941 A1* 11/2018 Krishnan ............... G16H 40/63

* cited by examiner

PREDICTIVE INTERSECTION SEARCH

RELATED APPLICATION

This application is a continuation of U.S. patent application Ser. No. 15/624,284, filed Jun. 15, 2017, which is incorporated herein by reference.

BACKGROUND

A web search query can include a query that a user enters into a web search engine to obtain desired information. A web search query can include plain text and/or search directives to direct a manner in which a search engine searches for information. A web search query can differ from use of a query language, in that a query language can be governed by strict syntax rules.

DETAILED DESCRIPTION OF PREFERRED EMBODIMENTS

Figure 1A:
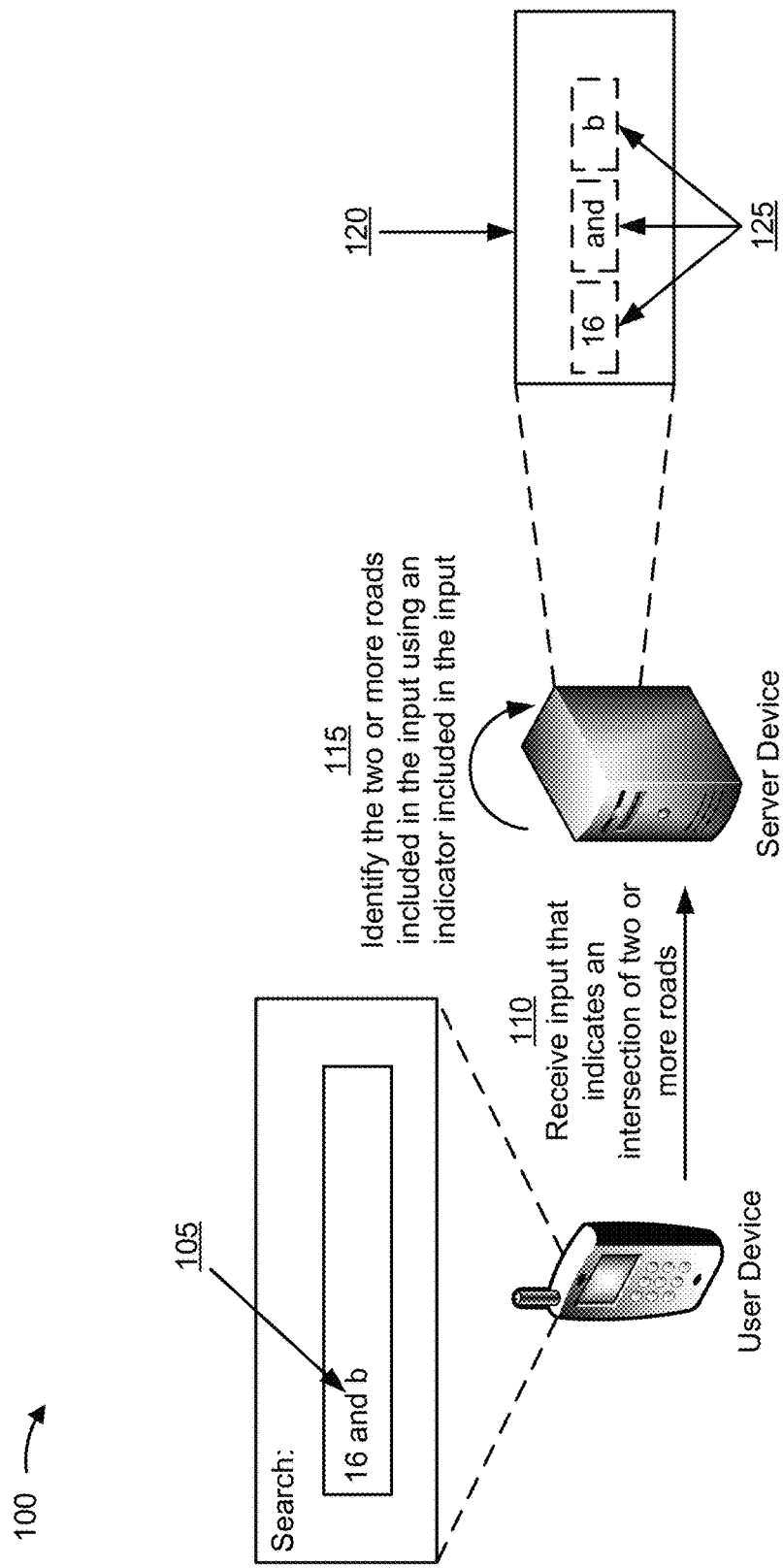
FIGS. 1A-1D are diagrams of an overview of an example implementation described herein.

The following detailed description of example implementations refers to the accompanying drawings. The same reference numbers in different drawings can identify the same or similar elements.

Use of a navigation system can include a search for an intersection (e.g., an intersection of two or more roads), such as to obtain a set of directions to the intersection. To perform a search for an intersection, a user of the navigation system can input a complete address of the intersection, such as full street names (e.g., "16th Street" rather than "16th," "16," "16 st.," etc.), a location of the intersection (e.g., a city in which the intersection is located, a state in which the intersection is located, etc.), a postal code, or other identifier, associated with the intersection, such as a zip code, and/or the like. For example, the user can input an address similar to "16th street and Blake street, Anywhere, CO, 22222" to search for an intersection of 16th street and Blake street in a particular city in a particular state. In addition, when a device performs a search for the intersection, the device can perform individual searches for each of the roads to determine whether the roads are associated with a geographic location and/or can determine whether the roads associated with the intersection actually intersect. Further, a device performing the search can lack a technique for intelligently predicting an intersection for which the user is searching.

This consumes processing resources of a device performing a search for the intersection when the user does not input a complete address of the intersection via failing to successfully identify the intersection and/or consumes time of the user by having the user identify and input a complete address of the intersection. In addition, this reduces an efficiency of searching for an intersection via consumption of processing resources and increased processing time (e.g., by performing individual searches for each of the roads, determining whether the roads actually intersect, etc.), by needing a complete address of the intersection (e.g., rather than intelligently predicting an intersection for which the user is searching), and/or the like.

Some implementations, described herein, provide a server device that is capable of searching for an intersection using input that includes an incomplete address for the intersection (e.g., "16 and Blake," "16th and Blake st," "16 and B," etc. rather than "16th street and Blake street, Anywhere, CO, 22222"). In addition, the server device can prioritize search results based on various factors. In this way, the server device can dynamically and predictively perform a search for an intersection. This conserves processing resources of the server device by increasing a flexibility of the server device to perform a search for an intersection using an incomplete address of the intersection. In addition, this conserves time of the user related to performing a search for an intersection and/or increases an efficiency of performing a search for an intersection by permitting use of an incomplete address for the intersection. Further, this increases an efficiency of performing a search for an intersection by reducing an amount of information the server device processes and/or searches to perform the search, thereby conserving processing resources of the server device.

Further, this increases an accuracy of performing a search for an intersection via prioritization of search results based on various factors. Further, the device can perform a search for an intersection without needing to perform individual searches for each of the roads to determine whether the roads are associated with a geographic location and/or to determine whether roads identified in the input actually intersect, thereby improving an efficiency of performing a search for an intersection and conserving processing resources of the device by reducing or eliminating a need for the server device to perform particular functions related to performing a search for an intersection.

FIGS. 1A-1D are diagrams of an overview of an example implementation 100 described herein. As shown in FIG. 1A, example implementation 100 can include a server device and a user device. Although implementation 100 shows a single user device and a single server device for explanatory purposes, in reality, there can be thousands, millions, billions, etc. of user devices and/or server devices.

As shown by reference number 105, a user of the user device can provide input (e.g., text input or voice input) that identifies an intersection. For example, and as further shown by reference number 105, the input can include an incomplete address for the intersection (e.g., "16 and b" rather than "16th Street and Blake Street, Anywhere, CO, 22222"). In some implementations, the input can include hundreds, thousands, millions, etc. of data elements from hundreds, thousands, millions, etc. of user devices.

As further shown in FIG. 1A, and as shown by reference number 110, the server device can receive input that indicates an intersection of two or more roads. For example, the server device can receive the input when a user of the user device indicates that the text is to be sent to the server device, such as by selecting a button on an interface, as the user is inputting the text (e.g., in real-time), and/or the like.

As further shown in FIG. 1A, and as shown by reference number 115, the server device can identify the two or more roads included in the input using an indicator included in the input. For example, the server device can identify the two or more roads in the input by identifying a term, a phrase, a symbol, and/or the like that separates each of the two or more roads included in the input. As shown by reference number 120, when identifying the two or more roads, the server device can parse the input. For example, the server device can identify a particular term, symbol, etc., such as "and" that separates input identifying each of the two or more roads included in the input. In this case, as shown by reference number 125, the server device can identify "16" as identifying a first road in the input and "b" as identifying a second road in the input based on "16" and "b" being separated by the term "and" in the input. In this way, the server device can process input to identify two or more roads included in the input.

Figure 1B:
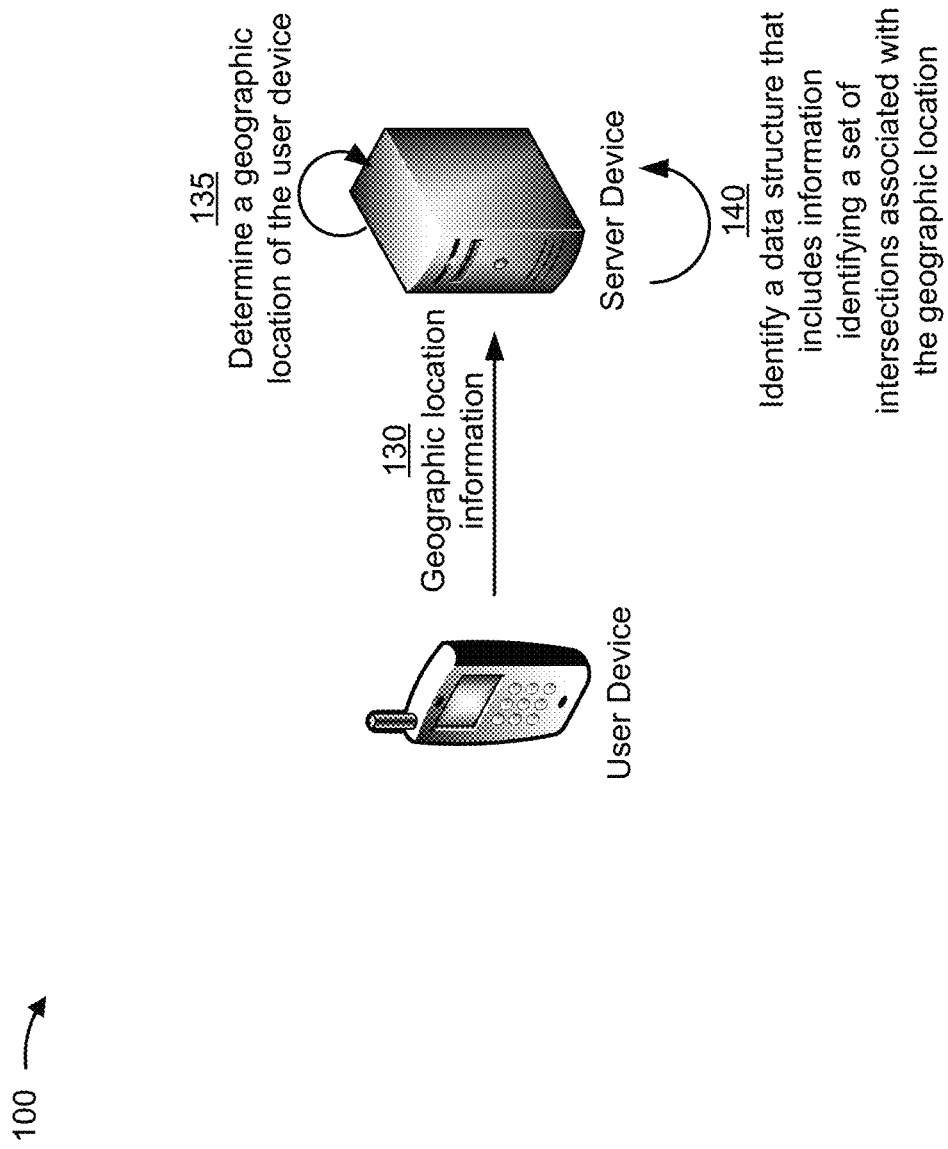

As shown in FIG. 1B, and as shown by reference number 130, the server device can receive geographic location information from the user device. For example, the geographic location information can include a global positioning system (GPS) location, an address associated with an account associated with the user device, input from the user of the user device, and/or the like. Additionally, or alternatively, the server device can receive other information, such as information related to prior searches of the user, information related to prior searches of other users of other user devices, information identifying landmarks or notable intersections, and/or the like (e.g., from the user device, memory resources of the server device, and/or the other server device).

As further shown in FIG. 1B, and as shown by reference number 135, the server device can determine a geographic location of the user device. For example, the server device can determine a geographic location of the user device using the geographic location information received from the user device. As shown by reference number 140, the server device can identify a data structure that includes information identifying a set of intersections associated with the geographic location. For example, the server device can identify a data structure that includes information identifying intersections associated with a particular city based on determining that the geographic location information identifies the particular city as the geographic location of the user device. This conserves processing resources of the server device by permitting the server device to focus a search to a particular geographic location, thereby reducing an amount of information the server device has to search to identify the intersection. In addition, this improves a search for an intersection by permitting the server device to more accurately identify potential matches (e.g., relative to a search that is not based on a geographic location).

Figure 1C:
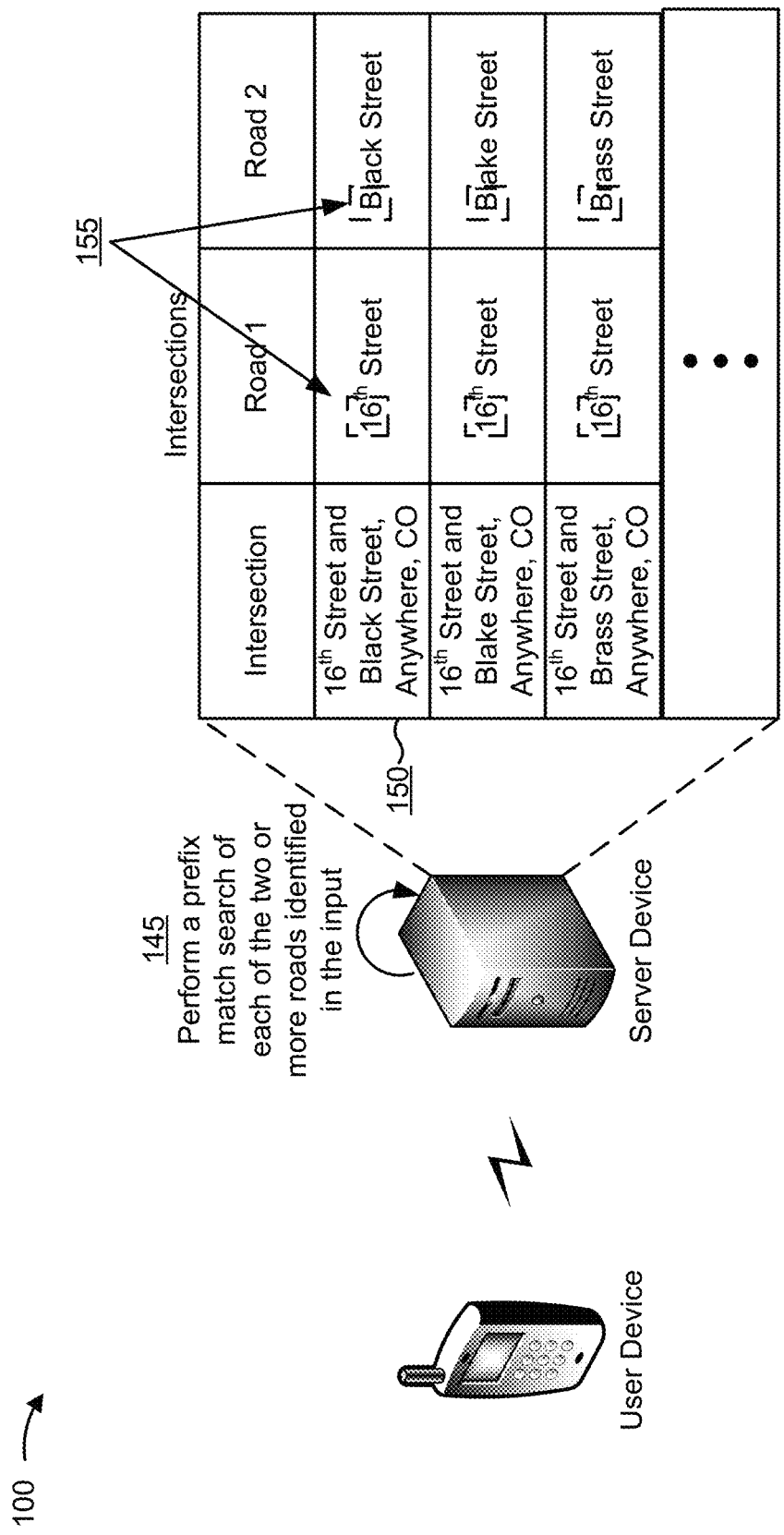

As shown in FIG. 1C, and as shown by reference number 145, the server device can perform a prefix match search of each of the two or more roads identified in the input. For example, the server device can match a prefix of each of the two or more roads identified in the input (e.g., "16" and "b") and a prefix of information in the data structure that identifies roads for a set of intersections associated with a geographic location.

As further shown in FIG. 1C, reference number 150 shows an example of information included in a data structure that the server device can search. For example, the information can identify a set of intersections, and roads associated with each intersection. As shown by reference number 155, the server device can identify a set of intersections where a name of one of the roads begins with "16" and a name of another of the roads begins with "b" based on performing prefix match searches of "16" and "b." In some implementations, when performing a search of the data structure, the server device can perform a search of thousands, millions, etc. of intersections associated with thousands, millions, etc. of roads. In this way, the server device can perform a search using a data set that cannot be processed manually. In this way, the server device can perform a search for an intersection associated with a geographic location without performing individual searches for two or more roads to determine whether the two or more roads are associated with a geographic location and/or without then determining whether the two or more roads actually intersect. This conserves processing resources of the server device by reducing or eliminating a need for the server device to perform particular operations related to performing a search for an intersection.

Figure 1D:
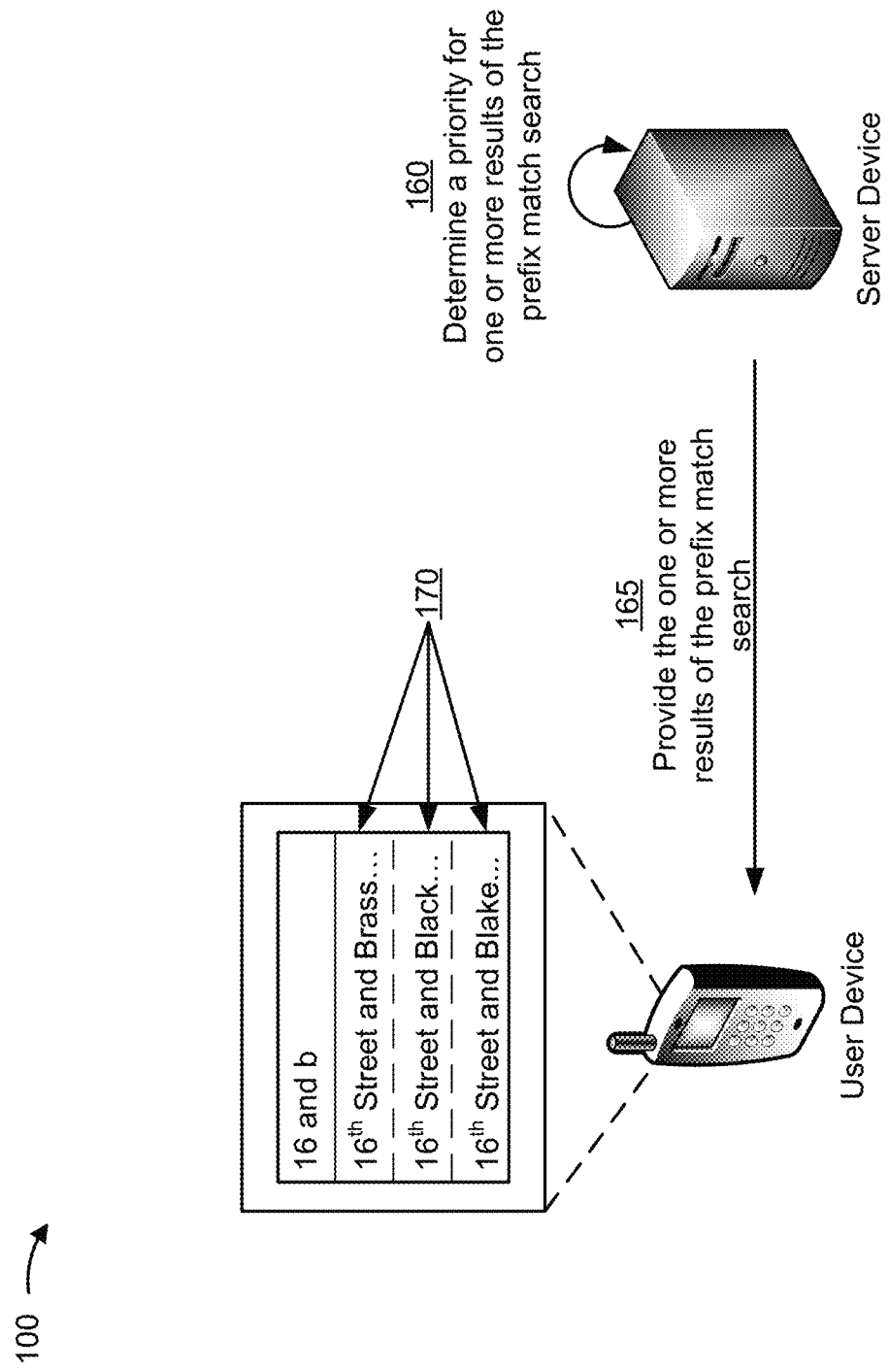

As shown in FIG. 1D, and as shown by reference number 160, the server device can determine a priority for one or more results of the prefix match search. For example, the server device can prioritize an intersection based on the user searching for the intersection a threshold quantity of times, based on other users of other user devices searching for a particular intersection a threshold quantity of times, based on a particular intersection being identified as a landmark, based on a distance of the intersection from the geographic location of the user device, based on a score determined using information related to a combination of previously mentioned factors, and/or the like.

As further shown in FIG. 1D, and as shown by reference number 165, the server device can provide the one or more results of the prefix match search to the user device. For example, the server device can provide information for display that includes complete addresses of identified intersections via the user device. In some implementations, the server device can provide results to hundreds, thousands, millions, etc. of user devices.

As shown by reference number 170, the user device can display a set of intersections that match the input of the user. In some implementations, the intersections can be organized based on the determined priority and can be displayed as complete addresses. For example, as shown, if the server device determined the address "16th and Brass Street, Anywhere, CO" to have a highest priority, the user device can display all or a portion of the "16th and Brass Street, Anywhere, CO" address at the top of a list of possible intersection addresses, beneath the "16 and b" incomplete address that was input by the user. In addition, the server device can dynamically update results of the search as the user of the user device inputs additional information. For example, if the user inputs the letter "l" after the letter "b," then the server device can remove "16th and Brass Street, Anywhere, CO" from the list of possible matches based on the input identifying a road that begins with "bl" rather than "br."

In this way, a server device can dynamically and predictively perform a search for an intersection. This conserves processing resources of the server device by increasing a flexibility of the server device to perform a search for an intersection using an incomplete address of the intersection. In addition, this conserves time of the user related to performing a search for an intersection and/or increases an efficiency of performing a search for an intersection by permitting use of an incomplete address for the intersection. Further, this increases an efficiency of performing a search for an intersection by reducing an amount of information the server device processes and/or searches to perform the search, thereby conserving processing resources of the server device.

Further, this increases an accuracy of performing a search for an intersection via prioritization of search results based on various factors. Further, the device can perform a search for an intersection without needing to perform individual searches for each of the roads to determine whether the roads are associated with a geographic location and/or to determine whether roads identified in the input actually intersect, thereby improving an efficiency of performing a search for an intersection and conserving processing resources of the device by reducing or eliminating a need for a server device to perform particular operations related to performing a search for an intersection.

As indicated above, FIGS. 1A-1D are provided merely as an example. Other examples are possible and can differ from what was described with regard to FIGS. 1A-1D. For example, although implementations described with respect to FIGS. 1A-1D use a prefix match search, other implementations can use other types of searches, as described elsewhere herein.

Figure 2:
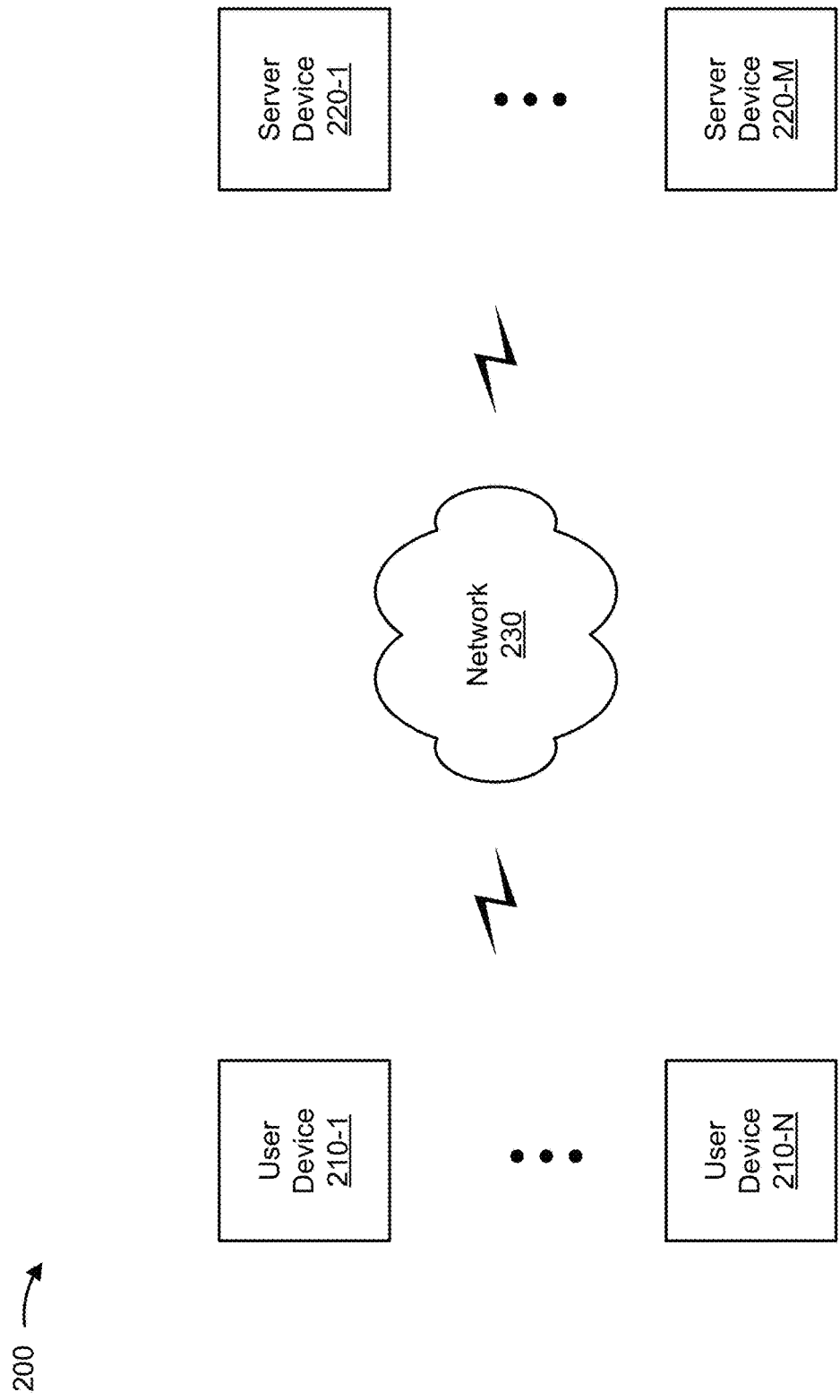
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include one or more user devices 210-1 through 210-N (N≥1) (hereinafter referred to collectively as "user devices 210," and individually as "user device 210"), one or more server devices 220-1 through 220-M (M≥1) (hereinafter referred to collectively as "server devices 220," and individually as "server device 220"), and a network 230. Devices of environment 200 can interconnect via wired connections, wireless connections, or a combination of wired and wireless connections.

User device 210 includes one or more devices capable of receiving, generating, storing, processing, and/or providing information associated with a predictive intersection search. For example, user device 210 can include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 can receive input from a user that identifies two or more roads of an intersection and can provide the input to server device 220 to cause server device 220 to perform a search for an intersection using the input, as described in more detail elsewhere herein. Additionally, or alternatively, user device 210 can receive a result of a search from server device 220, and can provide the result for display, as described in more detail elsewhere herein. In some implementations, there can be hundreds, thousands, millions, etc. of user devices 210.

Server device 220 includes one or more devices capable of receiving, storing, processing, generating, and/or providing information associated with a predictive intersection search. For example, server device 220 can include a server (e.g., in a data center or a cloud computing environment), a data center (e.g., a multi-server micro data center), a workstation computer, a virtual machine (VM) provided in a cloud computing environment, or a similar type of device. In some implementations, server device 220 can receive input from user device 210 and can perform a search to identify an intersection based on the input, as described in more detail elsewhere herein. Additionally, or alternatively, server device 220 can provide information identifying a set of possible intersections that match the input received from user device 210, as described in more detail elsewhere herein. In some implementations, there can be hundreds, thousands, millions, etc. of server devices 220.

Network 230 includes one or more wired and/or wireless networks. For example, network 230 can include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
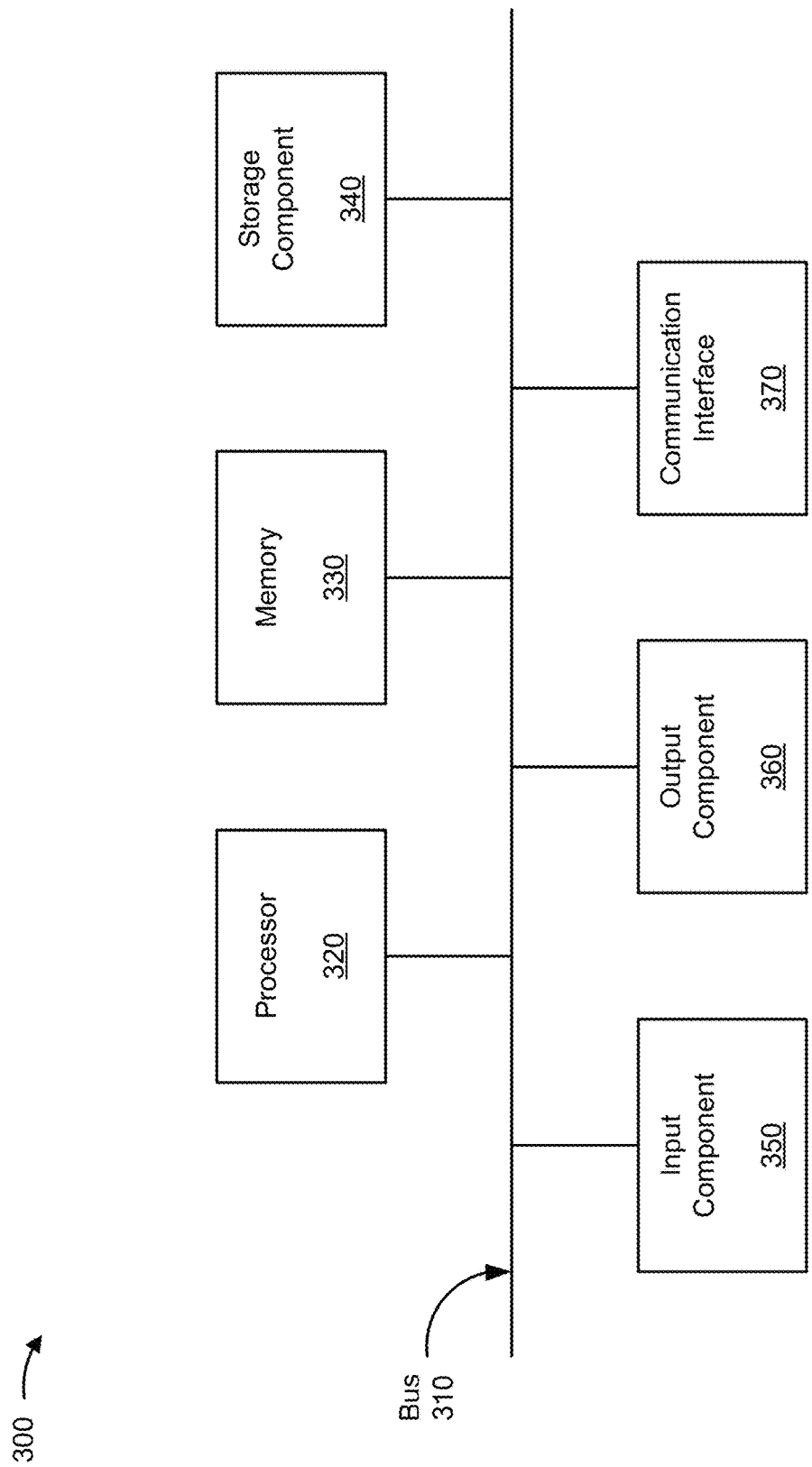
FIG. 3 is a diagram of example components of one or more devices of FIG. 2.

FIG. 3 is a diagram of example components of a device 300. Device 300 can correspond to user device 210 and/or server device 220. In some implementations, user device 210 and/or server device 220 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operations and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
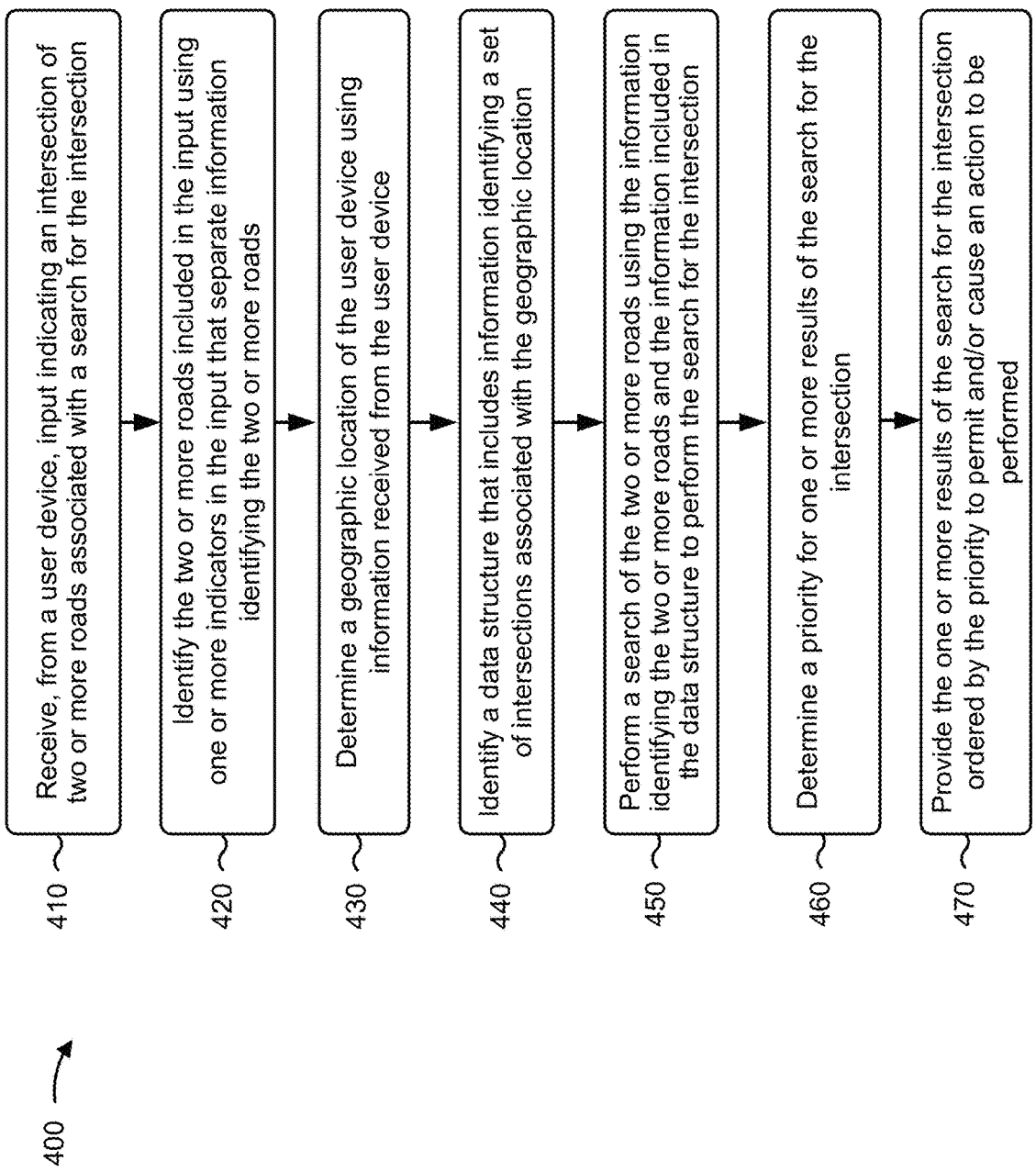
FIG. 4 is a flow chart of an example process for predictive intersection search.

FIG. 4 is a flow chart of an example process 400 for a predictive intersection search. In some implementations, one or more process blocks of FIG. 4 can be performed by server device 220. In some implementations, one or more process blocks of FIG. 4 can be performed by another device or a group of devices separate from or including server device 220, such as user device 210.

As shown in FIG. 4, process 400 can include receiving, from a user device, input indicating an intersection of two or more roads associated with a search for the intersection (block 410). For example, server device 220 can receive, from user device 210, input indicating an intersection of two or more roads associated with a search for the intersection (e.g., on a map).

In some implementations, server device 220 can receive the input periodically, according to a schedule, based on a user of user device 210 inputting information into user device 210, based on server device 220 requesting the information, and/or the like. In some implementations, the input can include text input, voice input, and/or the like. In some implementations, the input can include an incomplete address of an intersection. For example, the input can include portions of identifiers that identify the two or more roads. Continuing with the previous example, the input can include "16 and b" rather than "16th Street and Blake Street, Anywhere, CO, 22222," where "16" is a portion of an identifier of a first road associated with an intersection and "b" is a portion of an identifier of a second road associated with the intersection.

In some implementations, server device 220 can receive information related to a geographic location of user device 210. For example, server device 220 can receive information identifying a GPS location of user device 210, an address associated with an account associated with user device 210, input from the user of user device 210, and/or the like. As other examples, server device 220 can receive information related to other searches of a user of user device 210, information related to other searches by users of other user devices 210, information that identifies landmarks, and/or the like (e.g., from user device 210, from another server device 220, from memory resources of server device 220, etc.).

In some implementations, server device 220 can receive the information in real-time. For example, server device 220 can receive the information as a user of user device 210 is inputting the input to user device 210. In some implementations, server device 220 can receive the information when the user inputs a particular term, symbol, and/or the like (e.g., when the user inputs the term "and" indicating that the user is inputting information that identifies an intersection). This conserves processing resources of user device 210 and/or server device 220 by preventing user device 210 from providing input for a search for an intersection to server device 220 until a user inputs a particular term, symbol, and/or the like that indicates a search for an intersection.

In this way, server device 220 can receive input indicating an intersection of two or more roads associated with a search for the intersection to permit server device 220 to identify the two or more roads.

As further shown in FIG. 4, process 400 can include identifying the two or more roads included in the input using one or more indicators in the input that separate information identifying the two or more roads (block 420). For example, server device 220 can identify the two or more roads included in the input using one or more indicators in the input that separate information identifying the two or more roads. In some implementations, server device 220 can identify the two or more roads after receiving the input.

In some implementations, the one or more indicators can include a term, a symbol, and/or the like. For example, the one or more indicators can include "and," "&," "@" "+" "X," a term and/or symbol used in a language other than English (e.g., a term and/or symbol in another language that is similar to the previously described terms and/or symbols), and/or the like. This increases a flexibility of a search for an intersection by permitting a user of user device 210 to input a variety of indicators related to identifying an intersection.

In some implementations, server device 220 can use the one or more indicators to identify the two or more roads. For example, server device 220 can parse the input to identify the one or more indicators and can determine that input separated by the one or more indicators identifies the two or more roads. As a particular example, server device 220 can parse the input "16 and b" into the terms "16," "and," and "b." In this case, server device 220 can identify "and" as an indicator and can identify "16" and "b" as identifying two roads associated with an intersection based on being separated by the indicator "and." In some implementations, server device 220 can parse the input using text analysis, natural language processing, computational linguistics, and/or the like.

In this way, server device 220 can identify the two or more roads included in the input using one or more indicators in the input that separate information identifying the two or more roads.

As further shown in FIG. 4, process 400 can include determining a geographic location of the user device using information received from the user device (block 430). For example, server device 220 can determine a geographic location of user device 210 using information received from user device 210.

In some implementations, server device 220 can determine a GPS location of user device 210, a latitude and longitude of user device 210, a geographic region of user device 210, an address associated with an account associated with user device 210, location of a base station or wireless access point to which user device 210 is connected, and/or the like when determining a geographic location of user device 210. In some implementations, server device 220 can determine the geographic location using geographic information received from user device 210. Additionally, or alternatively, server device 220 can determine a geographic location by performing a look up of information related to user device 210 in a data structure, identifying a city in which user device 210 is located using latitude and longitude information received from user device 210, and/or the like.

In some implementations, user device 210 can determine a geographic location when user device 210 is moving. For example, server device 220 can determine an average latitude and longitude of user device 210 during a threshold amount of time, determine whether user device 210 is within city limits of a city (e.g., based on an average latitude and longitude of user device 210), a direction of travel of user device 210, a geographic location toward which user device 210 is moving, and/or the like.

In this way, server device 220 can determine a geographic location of user device 210 using information received from user device 210, to permit identification of a data structure that identifies a set of intersections associated with the geographic location of user device 210.

As further shown in FIG. 4, process 400 can include identifying a data structure that includes information identifying a set of intersections associated with the geographic location (block 440). For example, server device 220 can identify a data structure that includes information identifying a set of intersections associated with the geographic location of user device 210. In some implementations, a data structure can include a resource for storing information, a database, a file (e.g., a computer resource for recording data in a computer storage device, such as server device 220 and/or memory resources of server device 220), memory resources of user device 210 and/or server device 220, and/or the like. In some implementations, a data structure can be associated with a geographic location (e.g., a range of latitudes and longitudes, a city, a state, a region, a coverage area of a base station, etc.).

In some implementations, server device 220 can use information identifying a geographic location of user device 210 to perform a lookup when identifying a data structure. For example, server device 220 can perform a lookup of information identifying a geographic location in a data structure that includes information identifying various geographic locations and corresponding data structure identifiers. In this case, server device 220 can identify a data structure when a result of performing the lookup indicates a match. In some implementations, identifying a data structure associated with a geographic location can conserve processing resources of server device 220 when server device 220 performs a search by reducing an amount of information server device 220 needs to process when performing a search. In addition, searching information identifying intersections associated with a particular geographic location permits server device 220 to identify more accurate results (e.g., relative to a search of information identifying intersections without consideration of a geographic location of user device 210).

In this way, server device 220 can identify a data structure that includes information identifying a set of intersections associated with the geographic location of user device 210, thereby permitting server device 220 to perform a search using information included in the data structure.

As further shown in FIG. 4, process 400 can include performing a search of the two or more roads using the information identifying the two or more roads and the information included in the data structure to perform the search for the intersection (block 450). For example, server device 220 can perform a search of the two or more roads using the information identifying the two or more roads and the information included in the data structure to perform the search for the intersection (e.g., identify the intersection). In some implementations, a search can include a prefix match search, an exact match search, a case insensitive exact match search, a case insensitive prefix match search, a substring match search, a subsequence match search, and/or the like.

In some implementations, server device 220 can identify an intersection identified in the data structure where information identifying two or more roads associated with the intersection matches information identifying the two or more roads in the input (e.g., by performing a lookup of information identifying the two or more roads included in the input in the data structure, processing the data structure using information identifying the two or more roads included in the input, performing a comparison of information, etc.). For example, server device 220 can perform the search of the two or more roads and can identify one or more results where information identifying the two or more roads matches information identifying the roads associated with the set of intersections.

Continuing with the previous example, server device 220 can perform a prefix match search of a first road identified in the input and a prefix match search of a second road identified in the input and can identify an intersection where a result of both prefix match searches indicates a match. Continuing still with the previous example, if the input includes "16" and "b" as identifying two roads, server device 220 can perform a prefix match search to identify intersections where an identifier of a first road associated with an intersection begins with "16" and where an identifier of a second road associated with an intersection begins with "b."

In this case, server device 220 can identify an intersection when a result of the search indicates a match for both "16" and "b." In this way, server device 220 can perform a search for an intersection using a data structure that includes information identifying intersections associated with a geographic location. In addition, in this way, server device 220 can perform a single search for an intersection (e.g., a single search for the two or more roads) without needing to perform individual searches for each of the roads for the geographic location and/or without needing to determine whether roads identified in the input actually intersect, thereby improving an efficiency of performing a search for an intersection and conserving processing resources of server device 220 via a reduced quantity of operations that server device 220 has to perform.

In some implementations, server device 220 can perform a search for all intersections identified in the data structure (e.g., rather than terminating the search when the first match is identified). This can result in server device 220 identifying multiple potential intersections that match the user's input.

This improves results that are provided to user device 210 for display by providing a set of results from which a user of user device 210 can make a selection.

In some implementations, server device 220 can perform a search of particular intersections not associated with the geographic location of user device 210. For example, server device 220 can perform a search for information identifying intersections designated as landmarks, intersections for which a threshold quantity of users have previously searched, and/or the like. In some implementations, server device 220 can include information identifying an intersection not associated with the geographic location of user device 210 in a search result when a search indicates a match. This improves results of a search by permitting server device 220 to identify potentially relevant results that are not associated with a geographic location of user device 210 (e.g., relative to a search for an intersection that is limited to a geographic location of a user of user device 210), thereby conserving processing resources that would otherwise be consumed due to less accurate results.

In this way, server device 220 can perform a search of the two or more roads using the information identifying the two or more roads and the information included in the data structure to perform the search for the intersection.

As further shown in FIG. 4, process 400 can include determining a priority for one or more results of the search for the intersection (block 460). For example, server device 220 can determine a priority for one or more results of the search for the intersection (e.g., one or more intersections where information identifying roads associated with the one or more intersections matches input from user device 210). In some implementations, server device 220 can determine a priority for one or more results of the search after performing the search.

In some implementations, server device 220 can determine a priority based on prior searches of a user of user device 210. For example, server device 220 can determine a higher priority for a first identified intersection relative to a second identified intersection when a user of user device 210 has previously searched for the first identified intersection. In some implementations, server device 220 can determine a priority based on prior searches of other users of other user devices 210. For example, server device 220 can determine a higher priority for a first identified intersection relative to a second identified intersection based on a threshold quantity of other users searching for the first identified intersection, based on more users searching for the first identified intersection relative to the second identified intersection, and/or the like.

Additionally, or alternatively, server device 220 can determine a priority based on a geographic location of user device 210 relative to identified intersections. For example, server device 220 can determine a higher priority for a first identified intersection relative to a second identified intersection based on the first identified intersection being physically closer to the geographic location of user device 210 relative to the second identified intersection. Additionally, or alternatively, and as another example, server device 220 can determine a higher priority for a first identified intersection relative to a second identified intersection based on the user, or other users of other user devices 210, having performed a threshold quantity of searches for locations within a threshold distance of the first identified intersection.

Additionally, or alternatively, server device 220 can determine a priority based on a direction of travel of user device 210. For example, if server device 220 determines that user device 210 is travelling in a particular direction (e.g., using GPS information from user device 210), server device 220 can determine a higher priority for a first identified intersection relative to a second identified intersection based on the first identified intersection being in the same direction in which user device 210 is travelling.

Additionally, or alternatively, and as another example, server device 220 can determine a higher priority for a first identified intersection relative to a second identified intersection based on the first identified intersection being identified as a landmark, or other type of location, in the data structure (e.g., a tourist destination, a shopping district, etc.). For example, a first identified intersection within a threshold distance of a historical location or a tourist area can receive a higher priority relative to a second identified intersection, even if the first identified intersection is in a geographic location different than user device 210. As a particular example, for a search for "broadway and seventh avenue," server device 220 can prioritize Broadway and Seventh Avenue in New York City, N.Y. (Times Square) higher than another intersection of a Broadway and Seventh Avenue in another geographic location that is geographically closer to user device 210 based on Times Square being identified as a popular tourist destination in the data structure.

Additionally, or alternatively, and as another example, server device 220 can determine a higher priority for a first identified intersection relative to a second identified intersection based on a score associated with the first identified intersection. For example, server device 220 can determine a score for identified intersections based on a combination of the above described factors (e.g., where a factor that indicates a higher priority receives a higher score) and can prioritize a set of identified intersections based on corresponding scores for the set of intersections.

In this way, server device 220 can determine a priority for one or more results of the search prior to providing the one or more results to user device 210.

As further shown in FIG. 4, process 400 can include providing the one or more results of the search for the intersection ordered by the priority to permit and/or cause an action to be performed (block 470). For example, server device 220 can provide the one or more results of the search ordered by the priority to permit and/or cause an action to be performed (e.g., ordered from highest priority to lowest priority, grouped by various threshold priorities, etc.).

In some implementations, server device 220 can provide the one or more results to permit selection of an intersection from the one or more results (e.g., to cause server device 220 to determine a set of directions to a selected intersection). Additionally, or alternatively, server device 220 can provide the one or more results for display on a map. Additionally, or alternatively, server device 220 can determine a set of directions to the intersection. For example, server device 220 can determine a set of directions from a current location of user device 210 to the intersection. Additionally, or alternatively, server device 220 can provide a set of instructions to a vehicle (e.g., an autonomous vehicle) to cause the vehicle to travel to the intersection. Additionally, or alternatively, server device 220 can receive a user selection from the one or more results. In some implementations, server device 220 can store information identifying a user selection to permit server device 220 to improve future search results, to reduce or eliminate a need for server device 220 to perform the same search for the same user or a different user, and/or the like.

In some implementations, server device 220 can provide a determined set of directions to user device 210 for display (e.g., on a map). Additionally, or alternatively, server device 220 can open an application on user device 210 so that the application can provide a set of directions to the intersection for display via user device 210. Additionally, or alternatively, server device 220 can select an intersection from a set of intersections for which to generate a set of directions. For example, server device 220 can select an intersection with the highest score relative to other intersections when the score for the intersection satisfies a threshold. Additionally, or alternatively, when scores for a set intersections fail to satisfy a threshold, server device 220 can provide information identifying the set of intersections for display via user device 210 to permit a user of user device 210 to select a particular intersection.

Additionally, or alternatively, server device 220 can provide information related to locations within a threshold distance of an intersection for display via user device 210. For example, server device 220 can provide information related to landmarks, tickets for events, coupons, show times, and/or the like for locations within a threshold distance of an intersection. Additionally, or alternatively, server device 220 can generate a post on a social media website that identifies an intersection to which a user of user device 210 is travelling, an estimated arrival time for arriving at an intersection, and/or the like.

Additionally, or alternatively, server device 220 can perform additional searches as the user provides additional input or modifies previously provided input (e.g., in realtime). In some implementations, server device 220 can modify the one or more results provided to user device 210. For example, server device 220 can update a priority of search results provided to user device 210 (e.g., based on a direction of travel of user device 210, based on other users of other user devices 210 performing searches for various intersections, etc.).

In this way, server device 220 can provide the one or more search results of the search ordered by priority to permit and/or cause an action to be performed.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Some implementations, described herein, provide a server device that is capable of searching for an intersection using input that includes an incomplete address for the intersection (e.g., "16 and Blake," "16th and Blake st," "16 and B," etc. rather than "16th street and Blake street, Anywhere, CO, 22222"). In addition, the server device can prioritize search results based on various factors. In this way, the server device can dynamically and predictively perform a search for an intersection. This conserves processing resources of the server device by increasing a flexibility of the server device to perform a search for an intersection using an incomplete address of the intersection. In addition, this conserves time of the user related to performing a search for an intersection and/or increases an efficiency of performing a search for an intersection by permitting use of an incomplete address for the intersection. Further, this increases an efficiency of performing a search for an intersection by reducing an amount of information the server device processes and/or searches to perform the search, thereby conserving processing resources of the server device.

Further, this increases an accuracy of performing a search for an intersection via prioritization of search results based on various factors. Further, the device can perform a search for an intersection without needing to perform individual searches for each of the roads to determine whether the roads are associated with a geographic location and/or to determine whether roads identified in the input actually intersect, thereby improving an efficiency of performing a search for an intersection and conserving processing resources of the device by reducing or eliminating a need for the server device to perform particular operations related to performing a search for an intersection.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device, an input comprising:
a first incomplete street name,
at least a portion of a second street name, and
an indicator associated with identifying an intersection,
wherein the indicator separates the first incomplete street name and the at least a portion of the second street name;
identifying, by the device and based on the input, two or more roads or prefixes associated with the two or more roads;
performing, by the device and based on identifying the two or more roads or the prefixes, a search for the intersection using information identifying the two or more roads or the prefixes; and
providing, by the device and for display on a map, one or more results of the search to permit or cause one or more actions to be performed,
the one or more results identifying one or more intersections, and
the one or more actions including at least one of:
selecting a particular intersection, of the one or more intersections, associated with the two or more roads, or
determining a set of directions to the particular intersection.

2. The method of claim 1, further comprising:
determining a location of the device; and
wherein determining the set of directions to the particular intersection comprises:
determining the set of directions from the location of the device to the particular intersection.

3. The method of claim 1, further comprising:
providing the set of directions to a vehicle.

4. The method of claim 1, wherein selecting the particular intersection comprises:
selecting the particular intersection based on a user selection of a particular result of the one or more results.

5. The method of claim 4, further comprising:
storing information identifying the user selection to improve future search results.

6. The method of claim 1, further comprising:
providing, for display on the map, the set of directions.

7. The method of claim 1, further comprising:
causing an application to open; and
providing, for display via the application, the set of directions.

8. A device, comprising:
one or more memories; and
one or more processors communicatively coupled to the one or more memories, configured to:
receive an input comprising:
a first incomplete street name,
at least a portion of a second street name, and
an indicator associated with identifying an intersection,
wherein the indicator separates the first incomplete street name and the at least a portion of the second street name;
identify, based on the input, two or more roads or portions of names associated with the two or more roads;
perform a search for the intersection using information identifying the two or more roads or the portions of names; and
provide, for display on a map, one or more results of the search to permit or cause one or more actions to be performed,
the one or more results identifying one or more intersections, and
the one or more actions including at least one of:
a selection of a particular intersection, of the one or more intersections, associated with the two or more roads, or
a determination of a set of directions to the particular intersection.

9. The device of claim 8, wherein the one or more processors are further configured to:
provide information related to at least one of a landmark or an event associated with a location within a threshold distance of the particular intersection.

10. The device of claim 8, wherein the one or more processors are further configured to:
receive an additional input; and
modify the one or more results based on the additional input.

11. The device of claim 8, wherein the input is a voice input.

12. The device of claim 8, wherein the one or more processors are further configured to:
determine a location of the device; and
determine, based on the location, a priority for the one or more results.

13. The device of claim 8, wherein the one or more processors, when receiving the input, are configured to:
receive the input from another device; and
wherein the one or more processors are further configured to:
provide the set of directions to the other device.

14. The device of claim 13, wherein the one or more processors are further configured to:
cause an application to open on the other device, and
the set of directions being provided, for display, via the application.

15. A non-transitory computer-readable medium storing instructions, the instructions comprising:
one or more instructions that, when executed by one or more processors, cause the one or more processors to:
receive an input comprising:
a first incomplete street name,
at least a portion of a second street name, and
an indicator associated with identifying an intersection,
wherein the indicator separates the first incomplete street name and the at least a portion of the second street name;
identify, based on the input, two or more roads or prefixes associated with the two or more roads;
perform, based on identifying the two or more roads or the prefixes, a search for the intersection using information identifying the two or more roads or the prefixes; and provide, for display on a map, one or more results of the search to permit or cause one or more actions to be performed, the one or more results identifying one or more intersections, and the one or more actions including at least one of:

select a particular intersection, of the one or more intersections, associated with the two or more roads, or determine a set of directions to the particular intersection.

16. The non-transitory computer-readable medium of claim 15, wherein the one or more instructions, when executed by the one or more processors, further cause the one or more processors to:

determine a location of a user device; and wherein the one or more instructions, that cause the one or more processors to determine the set of directions to the particular intersection, cause the one or more processors to:

determine the set of directions from the location of the user device to the particular intersection.

17. The non-transitory computer-readable medium of claim 15, wherein the one or more instructions, when executed by the one or more processors, further cause the one or more processors to:

provide the set of directions to a vehicle.

18. The non-transitory computer-readable medium of claim 15, wherein the one or more instructions, that cause the one or more processors to select the particular intersection, cause the one or more processors to:

receive a user selection of a particular result of the one or more results.

19. The non-transitory computer-readable medium of claim 18, wherein the one or more instructions, when executed by the one or more processors, further cause the one or more processors to:

store information identifying the user selection to improve future search results.

20. The non-transitory computer-readable medium of claim 15, wherein the one or more instructions, when executed by the one or more processors, further cause the one or more processors to:

cause an application to open; and provide, for display via the application, the set of directions.

* * * * *